United States Patent
Beers et al.

(10) Patent No.: US 7,792,901 B2
(45) Date of Patent: Sep. 7, 2010

(54) RECONFIGURING A COLLABORATION EVENT

(75) Inventors: Ted Beers, Corvallis, OR (US); Jon A. Brewster, Monmouth, OR (US); Michael D. Derocher, Albany, OR (US); Lonnie D. Mandigo, Corvallis, OR (US); April S. Mitchell, San Jose, CA (US); Kenton O'Hara, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 141 days.

(21) Appl. No.: 12/251,686

(22) Filed: Oct. 15, 2008

(65) Prior Publication Data

US 2010/0095223 A1 Apr. 15, 2010

(51) Int. Cl.
G06F 15/16 (2006.01)
G06F 15/173 (2006.01)
G06F 15/177 (2006.01)

(52) U.S. Cl. .................. 709/204; 709/205; 709/221; 709/231; 709/239

(58) Field of Classification Search ............... 709/204, 709/205, 217, 221, 231, 239; 348/14.08; 375/240.01
See application file for complete search history.

(56) References Cited

U.S. PATENT DOCUMENTS

| | | | |
|---|---|---|---|
| 5,373,549 A | 12/1994 | Bales et al. | |
| 5,642,156 A | 6/1997 | Saiki | |
| 6,144,671 A * | 11/2000 | Perinpanathan et al. | 370/409 |
| 6,157,401 A | 12/2000 | Wiryaman | |
| 6,188,687 B1 * | 2/2001 | Mussman et al. | 370/388 |
| 6,356,943 B2 * | 3/2002 | Murray et al. | 709/220 |
| 6,396,510 B1 | 5/2002 | Pendse et al. | |
| 6,404,873 B1 | 6/2002 | Beyda et al. | |
| 6,426,948 B1 | 7/2002 | Bowman-Amuah | |
| 6,633,324 B2 | 10/2003 | Stephens, Jr. | |
| 7,003,086 B1 * | 2/2006 | Shaffer et al. | 379/202.01 |
| 7,023,465 B2 | 4/2006 | Stephens, Jr. | |
| 7,043,528 B2 | 5/2006 | Schmitt et al. | |
| 7,046,779 B2 | 5/2006 | Hesse | |
| 7,177,403 B2 | 2/2007 | Meyerson et al. | |
| 7,206,808 B2 | 4/2007 | Babka et al. | |
| 7,231,423 B1 | 6/2007 | Horstmann et al. | |
| 7,256,816 B2 | 8/2007 | Profanchik et al. | |
| 7,257,090 B2 | 8/2007 | Seavers et al. | |
| 7,324,636 B2 | 1/2008 | Sauvage et al. | |
| 7,327,731 B1 | 2/2008 | Kumar et al. | |
| 2001/0039568 A1 * | 11/2001 | Murray et al. | 709/204 |
| 2002/0118809 A1 | 8/2002 | Eisenberg | |
| 2002/0126201 A1 | 9/2002 | Schmitt et al. | |
| 2003/0174826 A1 | 9/2003 | Hesse | |
| 2005/0027581 A1 | 2/2005 | Kjesbu et al. | |
| 2005/0028106 A1 | 2/2005 | Nelson et al. | |
| 2005/0058088 A1 | 3/2005 | Decker et al. | |
| 2006/0164507 A1 | 7/2006 | Eshkoli et al. | |
| 2006/0164508 A1 | 7/2006 | Eshkoli et al. | |
| 2006/0256188 A1 | 11/2006 | Mock et al. | |

(Continued)

*Primary Examiner*—Quang N. Nguyen

(57) ABSTRACT

An event management system is configured to host a collaboration event that includes first and second event endpoints that provide respective first and second sets of audio/visual (A/V) media streams to respective first and second sets of attendees during the first event. The event management system is configured to, while hosting the collaboration event, reconfigure the collaboration event to cause a third event endpoint to provide a third set of audio/visual (A/V) media streams to at least one of the first set of attendees.

20 Claims, 9 Drawing Sheets

U.S. PATENT DOCUMENTS

| | | |
|---|---|---|
| 2006/0285672 A1 | 12/2006 | Levy et al. |
| 2007/0091169 A1 | 4/2007 | Zhang et al. |
| 2007/0091830 A1 | 4/2007 | Coulas et al. |
| 2007/0153712 A1 | 7/2007 | Fry et al. |
| 2007/0188596 A1 | 8/2007 | Kenoyer |
| 2007/0285501 A1 | 12/2007 | Yim |
| 2007/0285503 A1* | 12/2007 | Asthana et al. .......... 348/14.08 |
| 2007/0285504 A1 | 12/2007 | Hesse |
| 2007/0286384 A1 | 12/2007 | Christensen et al. |
| 2007/0300165 A1 | 12/2007 | Haveliwala |
| 2008/0030572 A1 | 2/2008 | Roher et al. |
| 2008/0267282 A1* | 10/2008 | Kalipatnapu et al. ... 375/240.01 |

* cited by examiner

RECONFIGURING A COLLABORATION EVENT

BACKGROUND

Collaboration event systems allow for collaboration between people in different locations. These systems allow participants to interact with one another through the use of audio and video equipment that provides real time audio and video communications. The process of connecting people across various locations may become complex, particularly where different groups of people desire to use part of the same collaboration event system for different collaboration events.

A collaboration event facility may have multiple event resources near one another. These event resources may have varying features that make their use more or less suited for different collaboration events. The resources may also have varying availability due to use by other collaboration events, resource malfunction or maintenance issues, or lack of access to a resource by attendees. The lack of availability of a resource may, at times, cause a collaboration event to commence with a topology that is less than optimal for the event or conclude prior to a desired end time.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense.

As described herein, an event management system manages collaboration events such as video teleconferences. The event management system maintains registered event specifications for each collaboration event and dynamic event context information that describes the status of collaboration events relative to each other. The event management system uses the registered event specifications and the dynamic event context information to optimize the interaction between collaboration events. The event management system also includes event endpoint information and policies that describe relationships among endpoints and rules associated with endpoints and event attendees.

The event management system enables and facilitates event topology reconfigurations during collaboration events based on the dynamic event context information. By doing so, the event management system allows all or portions of the topology of an event to be moved to one or more different locations and/or swapped with the topology of another event. The event management system redirects the media streams of the reconfigured event or events based on the topology changes. The event management system interacts with attendees of the affected event or events so that the attendees move or swap their physical locations in conjunction with the topology changes and continue participating in their respective event or events.

Figure 1:
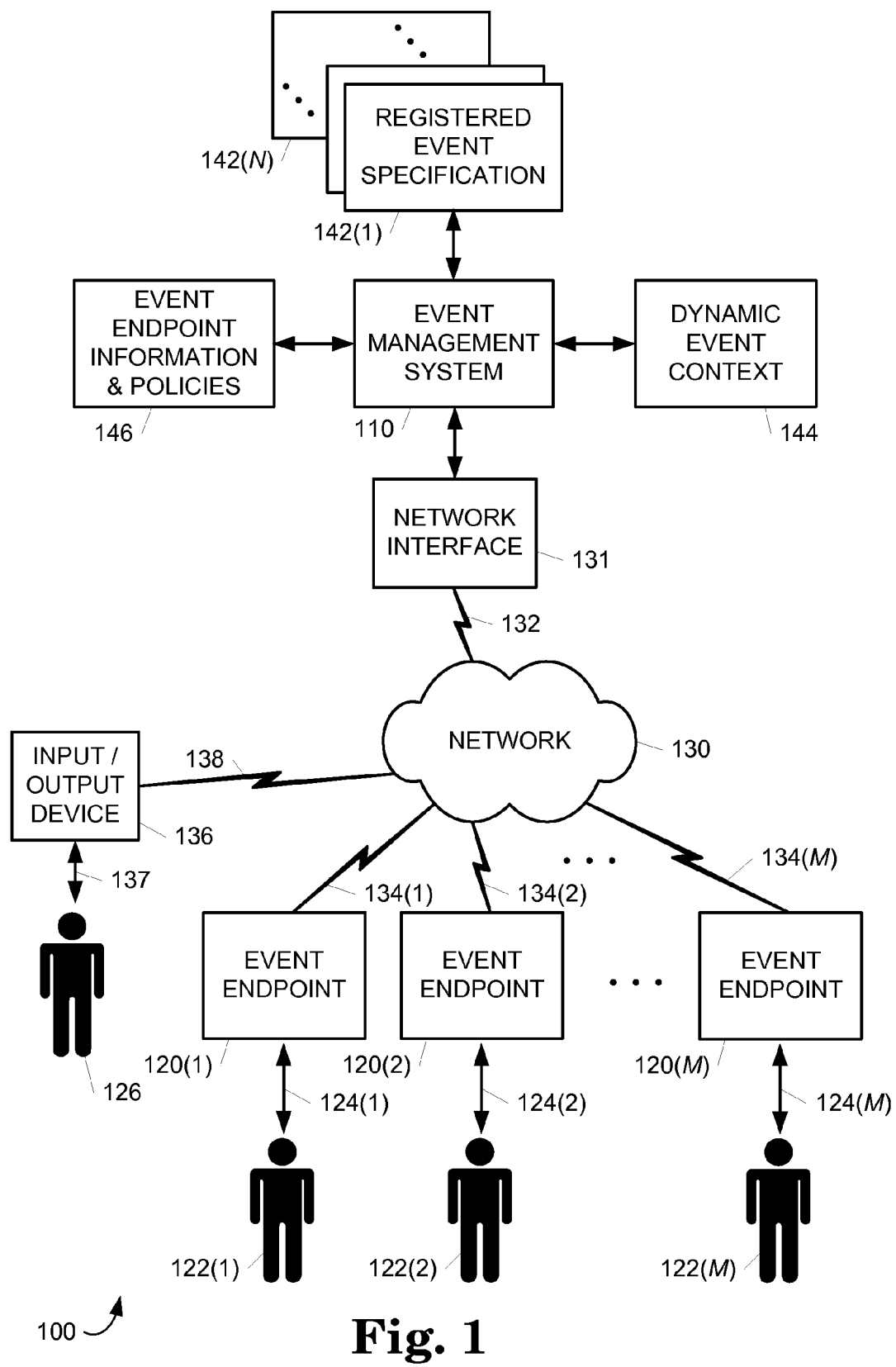
FIG. 1 is a block diagram illustrating one embodiment of a collaboration event system.

FIG. 1 is a block diagrams illustrating one embodiment of a collaboration event system 100. Collaboration event system 100 includes an event management system 110, a set of event endpoints 120(1)-120(M), and a network 130 that interconnects event management system 110 and event endpoints 120.

Collaboration event system 100 is configured to create and host collaboration events. A collaboration event is an activity with experiential relevance to people, possessing an extension in time and location. Examples of a collaboration event (hereafter "event") include telepresence videoconferences and meetings conducted using collaboration studio such as a "Halo studio" offered by Hewlett-Packard Co. For each event, collaboration event system 100 exchanges a selected set of audio and/or video (A/V) media streams 124(1)-124 (M) between a selected set or subset of event endpoints 120(1)-120(M).

An event includes a set of collaboration system topologies, each of which include a set or subset of event endpoints 120(1)-120(M). An event also includes a registered event specification 142 that specifies information such as a unique identity token, a purpose, a list of event attendees, a list of event resources, contact information of a host of the event, a priority of the event, start and end dates and times, and/or an event duration. Event resources may include event endpoints 120, physical locations (e.g., a collaboration studio or conference room), input/output devices 136 (e.g., interactive touchpoints), and attendees 122.

The collaborative event may take place in two or more locations (e.g., different cities) that each have an event endpoint 120 to connect a set of one or more attendees 122 or media resources in each of the locations. Cameras and microphones, for example, may capture video and audio from one or more of the locations (i.e., at one endpoint) and the video and audio may be output using one or more display devices and speakers, for example, at one or more other locations (i.e., one or more other endpoints). In addition, various types of pre-recorded A/V data, such as content from a DVD, may be transported to one or more of the locations where it may be output using a display device or speakers, for example. One or more locations of the collaborative event may include arrangements of office furniture (e.g., office chairs and a conference table) and A/V gear to provide persons with gaze awareness and a full immersive feeling.

Event management system 110 is configured to initiate, execute, host, and optimize collaboration events using registered event specifications 142(1)-142(N), dynamic event context 144, and event endpoint information and policies 146. Each event is registered with event management system 110, either in advance (i.e., scheduled ahead of time) or in real time (i.e., scheduled on an ad hoc basis), to create a registered event specification 142 for the event using any suitable device for accessing event management system 110 (e.g., an event endpoint 120 or an input/output device 136). Event management system 110 may reference and use each registered event specification 142 for various purposes including preparation for and execution of an event in accordance with the information in a registered event specification 142.

Dynamic event context 144 is real-time information that describes the status of events (e.g., in-progress, interrupted, extended, etc.), the status of events relative to each other (e.g., overlapping or not overlapping based on the start and end times of events), the status of event endpoints 120 and other media resources (e.g., available, reserved, in use or otherwise occupied, or unavailable), and the status of attendees 122 (e.g., checked-in at an event endpoint 120 or elsewhere or not checked-in along with any special privilege indicators or other attendee designations) for each event. Event management system 110 generates and maintains dynamic event context 144 to monitor and manage the real-time system status of collaboration event system 100.

Endpoint information and policies 146 describes the locations, topologies, configurations, and operation policies of event endpoints 120(1)-120(M). Event management system 110 accesses event endpoint information and policies 146 for use in configuring and optimizing collaboration events. Event management system 110 may also reference and use other system information such as the time of day in the process of managing collaboration events.

Each event endpoint 120(1)-120(M) provides a respective set of one or more attendees 122(1)-122(M) with a respective set of one or more audio and/or visual media streams 124(1)-124(M) using network 130. Each event endpoint 120 includes any suitable type, number, and combination of audio and/or visual input and/or output devices that are configured to generate, provide, and/or receive the respective set of media streams 124. Media streams 124 may each be any suitable combination of live or pre-recorded audio and/or video data and/or collaborative data such as XML data that may be combined in any suitable way and output to any number of attendees 122 in any number of event endpoints 120 by collaboration event system 100. Each set of attendees 122(1)-122(M) includes one or more people where the number of people may stay the same, increase, or decrease during the course of an event. In addition, the set of event endpoints 120 for an event may stay the same, increase, or decrease during the course of an event.

Figure 2A:
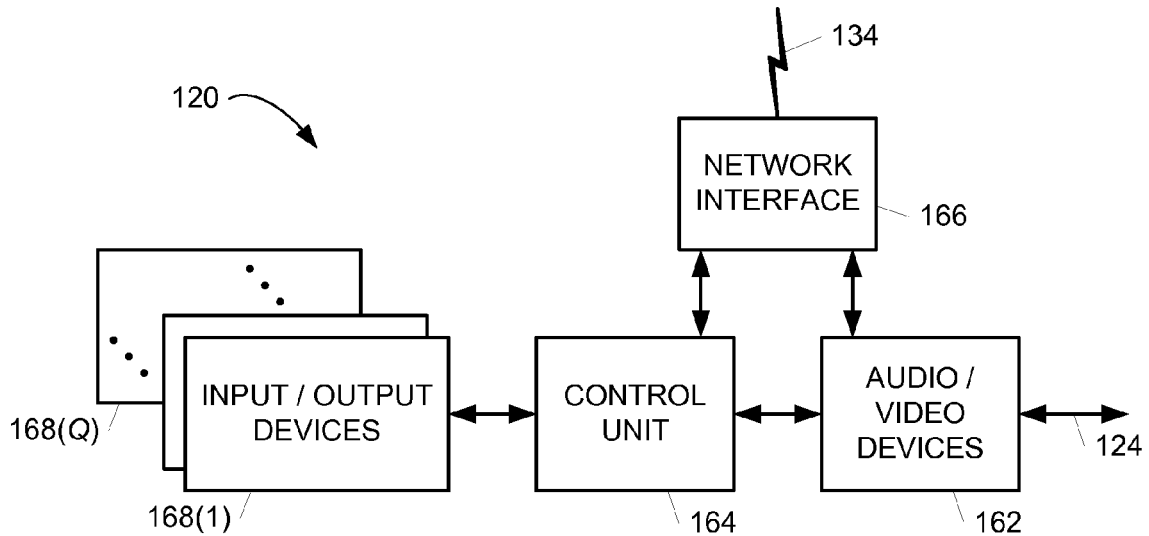
FIGS. 2A-2B are block diagrams illustrating embodiments of an event endpoint.
Figure 2B:
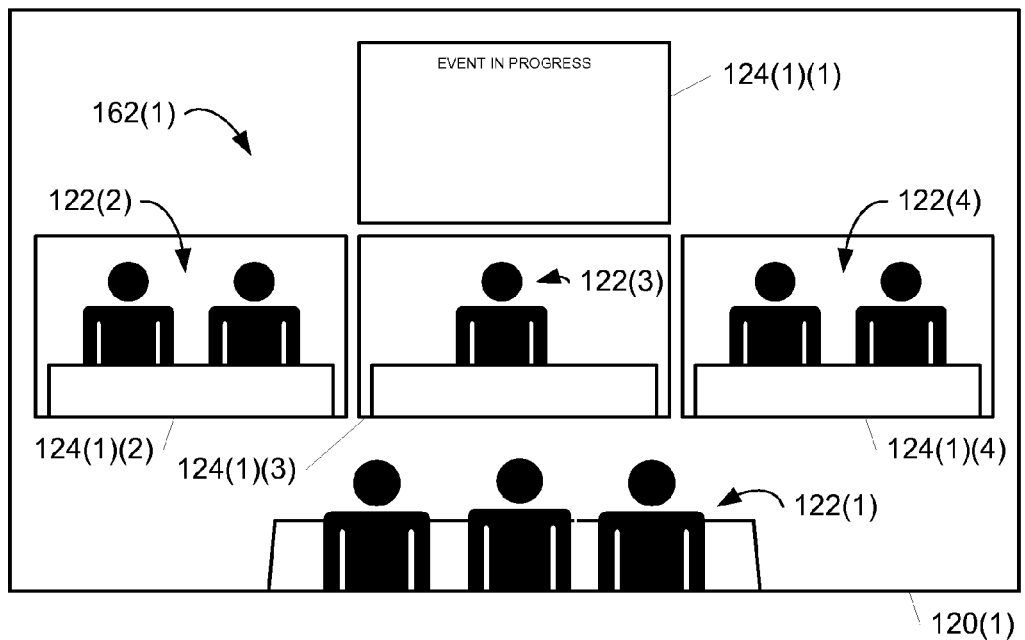

FIGS. 2A-2B are block diagrams illustrating embodiments of event endpoint 120. In the embodiment of FIG. 2A, event endpoint 120 includes a set of one or more audio and/or video (A/V) devices 162, a control unit 164, a network interface 166 and a set of one or more input/output (I/O) devices 168(1)-168(Q).

A/V devices 162 includes any type, number, and combination of audio and/or video input and/or output devices. Examples of A/V input devices include microphones, still and video cameras, media players, and computer and storage systems. The A/V input devices capture, detect, receive or otherwise input live or pre-recorded media streams 124 and provide the input media streams 124 to control unit 164 and/or network interface 166. Examples of A/V output devices include speakers, headphones, headsets, media recorders, and display devices such as projectors, computer monitors, and televisions. The A/V output devices receive media streams from control unit 164 and/or network interface 166 and provide, display, play, or otherwise output live or pre-recorded media streams 124.

Control unit 164 manages the operation of event endpoint 120 by providing control signals and/or other information to and receiving control signals and/or other information from A/V devices 162, network interface 166 and input/output devices 168(1)-168(Q). In some embodiments, control unit 164 may perform processing on media streams received from A/V devices 162 and/or network interface 166 prior to the media streams being provided to network interface 166 or output by A/V devices 162. The processing may include coding or decoding media streams from one media and/or network format to another media and/or network format.

Network interface 166 includes any suitable type, number, and/or combination of network devices that allow event endpoint 120 to communicate with network 130 (shown in FIG. 1) using network connection 134. Network interface 166 receives media streams across network connection 134 and provides the media streams to control unit 164 and/or A/V devices 162. Network interface 166 also receives media streams from control unit 164 and/or A/V devices 162 and provides the media streams to network 130 using network connection 134.

I/O devices 168(1)-168(Q) include any suitable type, number, and/or combination of input and/or output devices that allow attendees 122, administrators, or other persons to communicate with event endpoint 120. The communications may cause event endpoint 120 and/or collaboration event system 100 to perform functions indicated by attendees 122, administrators, or other persons. Examples of I/O devices 168 include interactive touchpoints, display screens, keyboards, and selection or navigation devices (e.g., a mouse, joystick, flywheel, or touchpad).

In other embodiments, the functionality of an A/V device 162 and an I/O device 168 may be included in a single unit such as a laptop computer. In addition, other embodiments may include A/V devices 162 but omit I/O devices 168 or may include I/O devices 168 but omit A/V devices 162.

FIG. 2B illustrates an embodiment of the operation of endpoint 120(1). Endpoint 120(1) provides attendees 122(1) who are present at endpoint 120(1) with media streams 124(1)(1)-124(1)(4) using any suitable type and/or combination of audio/video devices 162(1). Audio/video devices 162(1) are configured to allow for gaze awareness and a full immersion feeling for attendees 120(1).

In the example of FIG. 2B, media stream 124(1)(1) provides information about the event attended by attendees 122(1) (e.g., status information, notifications, configuration options, etc.) and media streams 124(1)(2)-124(1)(4) provide audio and video representations of by attendees 122(2)-122(4), respectively, who are present at event endpoints 120(2)-120(4), respectively. Attendees 122(1)-122(4) collectively represent the set of attendees who are present for the event illustrated by the example of FIG. 2B. In other embodiments, endpoint 120(1) may provide other numbers of media streams 124(1) to attendees 120(1) and may have other configurations of audio/video devices 162(1) relative to attendees 120(1).

Figure 3A:
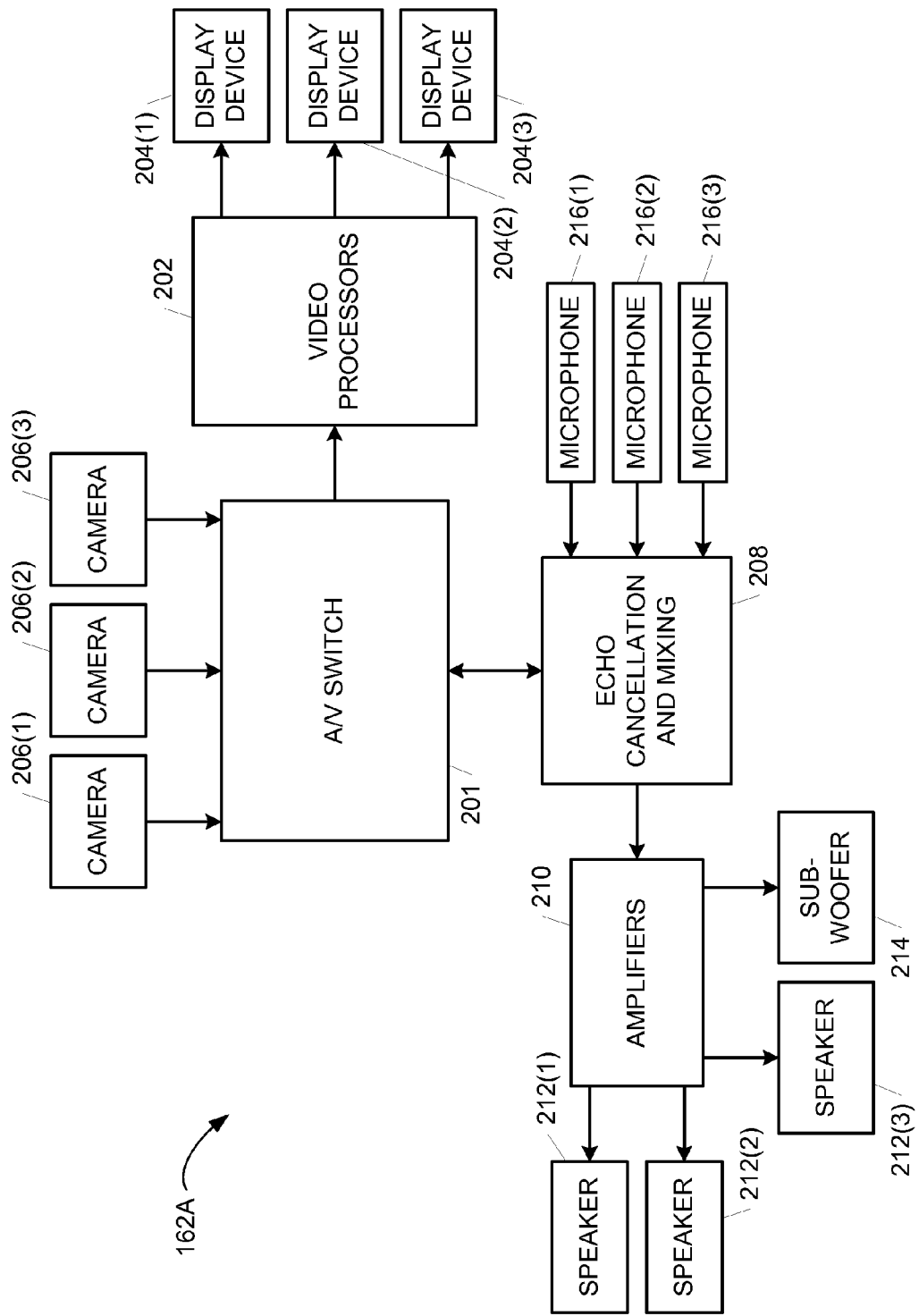
FIGS. 3A-3B are block diagrams illustrating embodiments of configurations of audio/video devices.
Figure 3B:
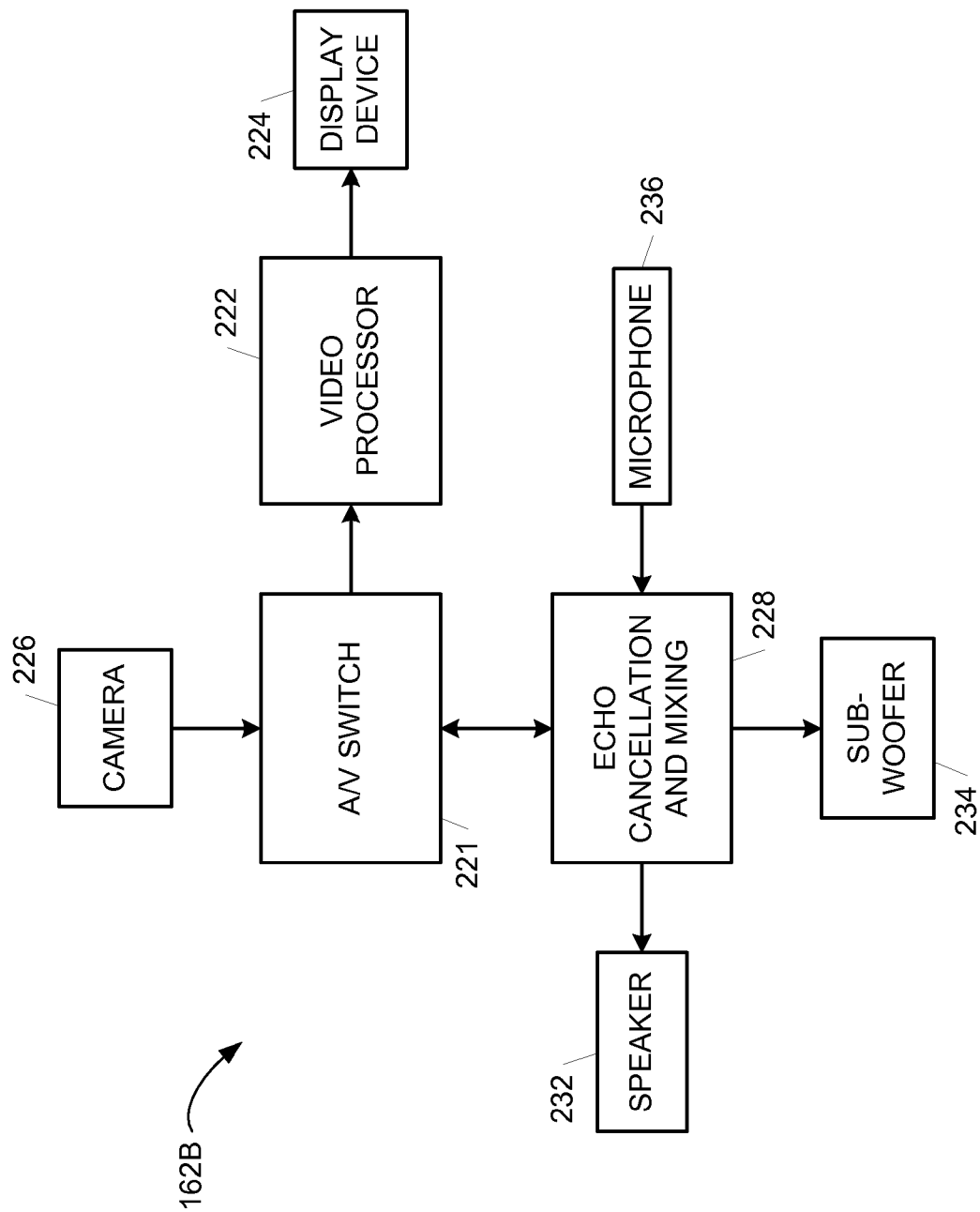

FIGS. 3A-3B are block diagrams illustrating embodiments of configurations of audio/video devices 162.

In one embodiment, A/V devices 162 includes integrated A/V gear that forms a collaboration studio such as a "Halo studio" offered by Hewlett-Packard Co. as shown in the embodiment 162A of FIG. 3A. In the embodiment of FIG. 3A, video processors 202 provide video data from A/V switch 201 to display devices 204(1)-204(3), and display devices 204(1)-204(3) display the video data. Cameras 206(1)-206(3) capture video data and provide the video data to A/V switch 201. An echo cancellation and mixing unit 208 mixes and processes audio data from A/V switch 201 and provides the processed audio data to amplifiers 210. Amplifiers 210 amplify the audio data and provide the audio data to speakers 212(1)-212(3) and sub-woofer 214. Speakers 212(1)-212(3) output the higher frequencies of the audio data, and sub-woofer 214 outputs the lower, bass frequencies of the audio data. Microphones 216(1)-216(3) capture audio data and provide the audio data to A/V switch 201.

Display devices 204(1)-204(3) may be arranged in such a manner around a conference table and chairs to allow for gaze awareness and a full immersion feeling in one embodiment.

In another embodiment, A/V devices 162 includes A/V gear as shown in the embodiment 162B of FIG. 3B. In the embodiment of FIG. 3B, video processor 222 provides video data from A/V switch 221 to display device 224, and display device 224 displays the video data. Camera 226 captures video data and provides the video data to A/V switch 221. An echo cancellation and mixing unit 228 mixes and processes audio data from A/V switch 221 and provides the processed audio data to speaker 232 and sub-woofer 234. Speaker 232 outputs the higher frequencies of the audio data, and sub-woofer 234 outputs the lower, bass frequencies of the audio data. Microphone 236 captures audio data and provides the audio data to A/V switch 221 through echo cancellation and mixing unit 228.

Referring back to FIG. 1, network 130 may be any suitable type of network or combination of networks formed from any suitable number, type, and/or combination of network devices (not shown). The network devices may operate using any suitable network protocol or protocols and may connect to any suitable number of event endpoints 120 or other computer or storage systems. Network 130 may include any suitable combination of secure networks (e.g., enterprise networks or corporate intranets) with limited and secure connections to other systems or unsecure networks with at least one unsecure connection to another system.

Network 130 may be a local, regional, or global network of any suitable network configuration that ranges from local point-to-point connections between event management system 110 and event endpoints 120 to a global array of connections that interconnect event management system 110 and event endpoints 120. Network 130 may be private or publicly available and include one or more connections to the Internet.

Network 130 may be designed specifically to optimize high bandwidth with low latency to be able to transport live, interactive, audio, video, and other data rich media streams. Network 130 may have a smallest link of 45 Mbps, in one embodiment, to avoid any significant serialization delay. Network 130 may also use a flat network topology to minimize latency. In order to keep a high quality end-user experience, network 130 may keep the total one-way latency between any event endpoints 120 to less than one-quarter of a second. This total latency may encompass all aspects of encoding/decoding, encapsulation/de-encapsulation, capture and presentation, filtering, processing, compression and decompression, image compositing, and transport latencies across the transmission path. As the contribution of each component of network 130 to overall latency decreases (as technology improves), the length of the "reach" of where different sites can be physically located may be increased.

To better preserve the shortest paths capable of reliable delivery with little packet loss, bandwidth and network resource mechanisms (not shown) may be used to insure high-quality sessions for the duration of the collaboration session. As most traffic streams are presumed to take place linking a pair or small number of event endpoints 120 together for any given session, event management system 110 may have little presumption of event pre-emption once authorized events commence. In some embodiments, longer latency and/or loss tolerant sessions may be provided over network 130. Such services may include directory, presence, messaging, credential verification, calibration, and time/name services for examples.

The interior of network 130 may concentrate on speedy delivery of traffic flows. Any access control, encryption/decryption and other proxy services, if needed, may occur at the edge of network 130 such as in event endpoints 120 and not the interior of network 130 in some embodiments. This design may make the core of the backbone of network 130 simpler to grow, maintain, stablize, and attain the desired latency.

Event management system 110 connects to network 130 using a network interface 131 and a network connection 132, and event endpoints 120(1)-120(M) connect to network 130 using respective network connections 134(1)-134(M). Each network connection 132 and 134(1)-134(M) may include any suitable type, number, and/or combination of wired or wireless network connections. For example, network connections 132 and 134(1)-134(M) may each be a leased line (i.e., a T3, optical, cable, or wireless high speed link) which provides a large data pipe to and from event management system 110, event endpoints 120(1)-120(M), and input/output device 136, respectively.

Input/output (I/O) device 136 may be any suitable type of device (e.g., a portable or non-portable device such as an interactive touchpoint, a computer, a cell phone, a media player, or a personal digital assistant) configured to communicate with event management system 110 and thereby form an event management client. I/O device 136 is configured to receive inputs from a person 126 and/or provide outputs to person 126 as indicated by an arrow 137. The inputs and outputs may include audio and/or video inputs and outputs. I/O device 136 connects to network 130 using any suitable wired or wireless network connection 138. I/O device 136 may be omitted in some embodiments.

Person 126 may be associated with an event in various ways. For example, person 126 may be an organizer or registered attendee of an event who is identified by registered event specification 142 for the event. Person 126 may also be someone acting on behalf of an organizer or registered attendee identified by registered event specification 142 for the event. Person 126 may further be attempting to register for the event by adding his or her name to registered event specification 142 for the event. In addition, person 126 may be located at or near an event endpoint 120 for the scheduled event.

In operation, event management system 110 initiates, executes, hosts, and optimizes collaboration events using registered event specifications 142(1)-142(N), dynamic event context 144, and event endpoint information and policies 146.

Event management system 110 initiates execution of an event by allocating resources for creating a real-time representation of the event according to the registered event specification 142 of the event to optimize the experience of attendees 122 and 126. The allocated resources include the set or a subset of event endpoints 120 as indicated by the registered event specification 142. Event management system 110 continues execution of the event with changes to the topology of the event (e.g., the addition or removal of event endpoints 120 during the event) to maintain and optimize the experience of attendees 122 and 126 and ends as dictated by the registered event specification 142 or by external inputs (e.g., from an attendee 122 and 126). During execution, event management system 110 may describe an event as being "in-progress".

In preparation for event execution (i.e., during event preparation) and during event execution, certain activities may be performed by event resources or event management system 110 that impact the management of the event, such as an attendee 122 checking in at an endpoint location, an input/output device associated with an endpoint, or another location. During the course of the lifecycle of an event, additional related artifacts may be added to the event, such as an archive of the execution of the event.

Event management system 110 optimizes event preparation and event execution for each registered event that requires various resources including those resources whose states may impact event preparation and execution. The optimization accounts for resources that may be in use by one or more in-progress events, resources that may be unavailable (e.g., requested for use by another event or out of service), key event attendees 122 that are missing, and other critical event information. Event management system 110 also optimizes event execution for in-progress events by preventing unwanted disruption of an event using resources required by the registered event and by handling requests for resources made by other events.

Event management system 110 performs the optimization using registered event specifications 142 for all related events including the primary event being prepared and other events in progress that are consuming needed resources and dynamic event context information 144 which includes information about event resources (e.g., resources used by other in-progress events and other status information about needed resources). Event management system 110 may also perform the optimization using information provided by attendees, administrators, and/or other persons via I/O devices 168 (shown in FIG. 2A) and/or 136 associated with the event in progress and the registered events and event endpoint information and policies 146. Event endpoint information and policies 146 includes information about the physical and assigned relationships among resources, including relationship information about event endpoints 120 and I/O devices 168 and/or 136, policies regarding the management of shared resources to facilitate optimal event execution, and principles governing the systems behaviors in consideration of the multitude of registered and dynamic information.

Using inputs from registered event specifications 142, dynamic event context information 144, I/O devices 168 and/or 136, and event endpoint information and policies 146, event management system 110 applies event optimization policies to interact with an in-progress event, with related resources such as endpoints 120, and with related input/output devices 168 and/or 136. In doing so, event management system 110 optimizes the experience of attendees 122 of an in progress event when optimal event resources become available after an in progress event begins. The unavailability of an optimal event resource, such as a desired endpoint 120, may be due an overlap with one or more other collaboration events, endpoint malfunction or maintenance issues, or lack of access to the resource by an attendee (e.g., a locked door).

As used herein, the term overlap refers to a commonality of resources between two or more events that may prevent one or more of the events from proceeding as currently defined by the respective registered event specifications 142 for the one or more events. The commonality may be an event endpoint or endpoints 120, an event attendee 122, an event resource (e.g., A/V equipment), or at least a portion of network 130 or network interfaces and connections 132 or 134, for example, where the commonality is not conducive to being used by two or more events at the same time or close to the same time.

Figure 4:
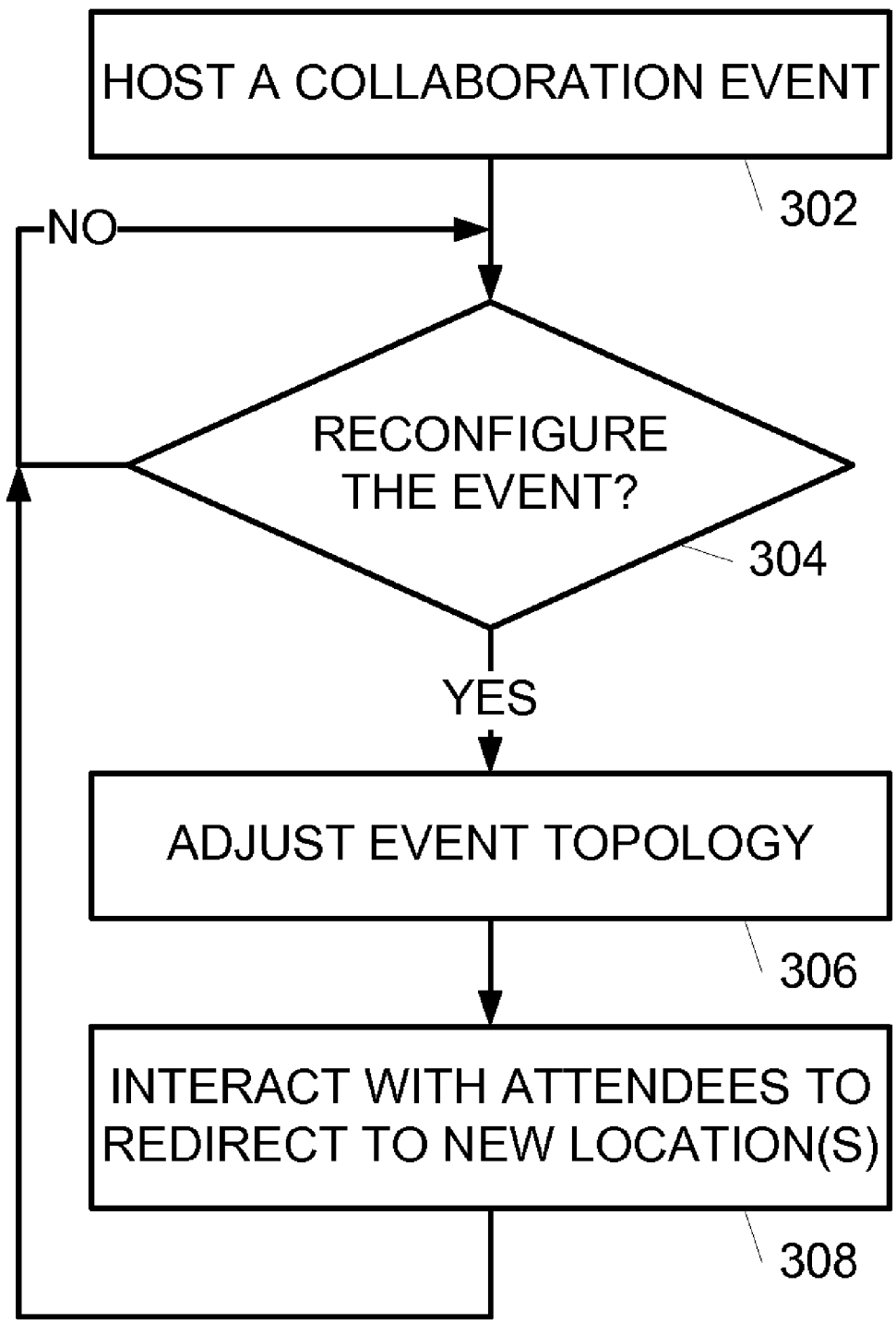
FIG. 4 is a flow chart illustrating an embodiment of a method performed by an event management system.

Event management system 110 enables and facilitates event topology reconfigurations during in progress events based on dynamic event context information 144 as illustrated in the embodiment of FIG. 4. With the embodiment of FIG. 4, event management system 110 allows all or portions of the topology of an event to be moved to one or more different locations and/or swapped with the topology of another event. Event management system 110 redirects media streams 124 of the reconfigured event or events based on the topology changes. Event management system 110 interacts with attendees 122 of the affected event or events so that the attendees 122 move or swap their physical locations in conjunction with the topology changes and continue participating in their respective event or events.

FIG. 4 is a flow chart illustrating an embodiment of a method performed by event management system 110. In FIG. 4, event management system 110 hosts a collaboration event as indicated in a block 302. The collaboration event includes a set of event endpoints 120 that provide respective sets of audio/visual (A/V) media streams 124 to respective sets of attendees 122 during the event as described in additional detail above.

Subsequent to initiating the collaboration event, a determination is made by event management system 110 as to whether the in progress event is to be reconfigured as indicated in a block 304. Event management system 110 may make the determination periodically, in response to status information determined from registered event specifications 142 and/or dynamic event context information 144, in response to receiving a request from an attendee 122 of the event, and/or in response to receiving a request from an attendee 122 of another event.

Event management system 110 may determine that the event is to be reconfigured for various reasons. These reasons include detecting an optimization of the in progress event and/or another event that overlaps with the in progress event using registered event specifications 142 and/or dynamic event context information 144 and detecting a request for the reconfiguration from an attendee of the in progress event and/or an attendee of another event. For example, event management system 110 may detect that an endpoint 120 is more suited for the in progress event than a current endpoint 120 in the event or is specifically requested for use by the in progress event in place of or in addition to a current endpoint 120 in the event. The new endpoint 120 may have been unavailable when the in progress event was initiated (e.g., in use or reserved for use by another event) but became available after the in progress event was initiated. In addition, a current endpoint 120 in the event may become unavailable during the event because of another event or a problem with the current endpoint (e.g., a malfunction) and cause event management system 110 to detect that the event is to be reconfigured.

If event management system 110 determines that the event is to be reconfigured, then event management system 110 adjusts the topology of the event as indicated in a block 306 and interacts with attendees 122 of the event to direct some or all of the attendees 122 to new endpoint locations as indicated in a block 308. In particular, event management system 110 reconfigures the in progress event to cause a new endpoint 120 to provide a set of audio/visual (A/V) media streams 124 to set of attendees 122 that moved to the new endpoint 120 from a previous endpoint 120 at a different location. Event management system 110 also reconfigures the in progress event to cause the previous endpoint to stop providing the set media streams 124. Accordingly, event management system 110 redirects the set of A/V media streams from the previous endpoint 120 to the set of attendees at the new endpoint 120.

Event management system 110 may determine the new endpoint 120 to add to the in progress event using event endpoint information and policies 146, information from attendees 122 of the event, and/or information from attendees 122 of another event. Event management system 110 may access event endpoint information and policies 146 to identify a new endpoint 120 that is near a current endpoint 120.

Event management system 110 may identify a new endpoint 120 from information provided by attendees 122 of the event and/or information provided by attendees 122 of another event (e.g., another event that wishes to use a current endpoint 120 of the in progress event).

Event management system 110 accesses registered event specifications 142 and/or dynamic event context 144 to determine if the new endpoint 120 is available for use by the in progress event. If the new endpoint 120 is available, event management system 110 redirects a set of A/V media streams 124 from a previous endpoint 120 to the new endpoint 120 and interacts with the attendees 122 at the previous endpoint 120 to direct one or more of the attendees 122 from the previous endpoint 120 to the new endpoint 120. Event management system 110 also updates the registered event specification 142 for the in progress event to add the new endpoint 120 and remove the previous endpoint 120.

Event management system 110 interacts with the attendees 122 to direct one or more of the attendees 122 to the new endpoint 120 in any suitable way. For example, event management system 110 may provide information to the attendees 122 that directs the attendees 122 to the new endpoint 120. Event management system 110 may also provide information that confirms the reconfiguration of the event to the attendees 122 where the new endpoint 120 was identified by the attendees. The information provided to and/or exchanged with the attendees 122 allows the attendees 122 to transition from the location of the previous endpoint 120 to the location of the new endpoint 120.

Event management system 110 may repeat the functions of blocks 304, 306, and 308 any number of times throughout the in progress event. In addition, event management system 110 may perform the method of FIG. 4 separately for each event hosted by event management system 110.

The use of the method of FIG. 4 will now be illustrated with reference to embodiments of endpoint locations in FIGS. 5A-5C.

Figure 5A:
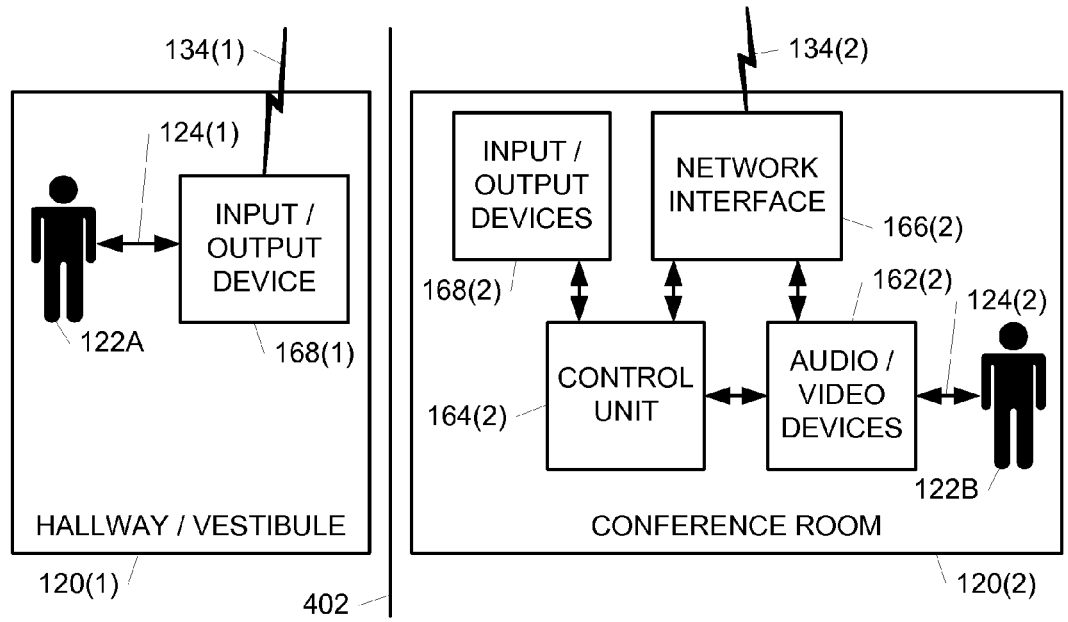
FIGS. 5A-5C are block diagrams illustrating embodiments of endpoint locations.

In one example, shown in the embodiment of FIG. 5A, attendees 122A of a first event (event A) may begin their event at an event endpoint 120(1) that is nearby a desired endpoint 120(2). Attendees 122A, for example, may desire to move into a conference room that includes an event endpoint 120(2) when a second event (event B) that is using endpoint 120(2) concludes. Attendees 122B of event B may eventually conclude their event to make event endpoint 120(2) available to event A or may indicate a desire or willingness to swap endpoint 120(2) with endpoint 120(1) as shown and described in the example of FIG. 6 below.

In the example of FIG. 5A, an input/output device 168(1) forms event endpoint 120(1) for attendees 122A. Input/output device 168(1) is located in a hallway or vestibule outside of or adjacent to the conference room that includes an event endpoint 120(2). The hallway or vestibule and the conference room are separated by a barrier 402 which may be a wall, a door, a corridor, or other suitable physical structure or space that separates the conference room from the hallway or vestibule. Input/output device 168(1) provides media streams 124(1) to attendees 122A and/or captures media streams 124(1) from attendees 122A. Attendees 122A of event A may use input/output device 168(1) without visually or audibly interrupting attendees 122B of event B taking place in the conference room. Event management system 110 recognizes the association between input/output device 168(1) and endpoint 120(2) using event endpoint information and policies 144.

Audio/video devices 162(2) of endpoint 120(2) that provide media streams 124(2) to attendees 122B and/or capture media streams 124(2) from attendees 122B are located inside the conference room. Input/output device 168(1) is located outside the conference room. Although other components of endpoint 120(2) are shown as being inside the conference room in the embodiment of FIG. 5A, some or all of these components may be located outside of or adjacent to conference room 402 in other embodiments (e.g., in a control room (not shown)).

Figure 5B:
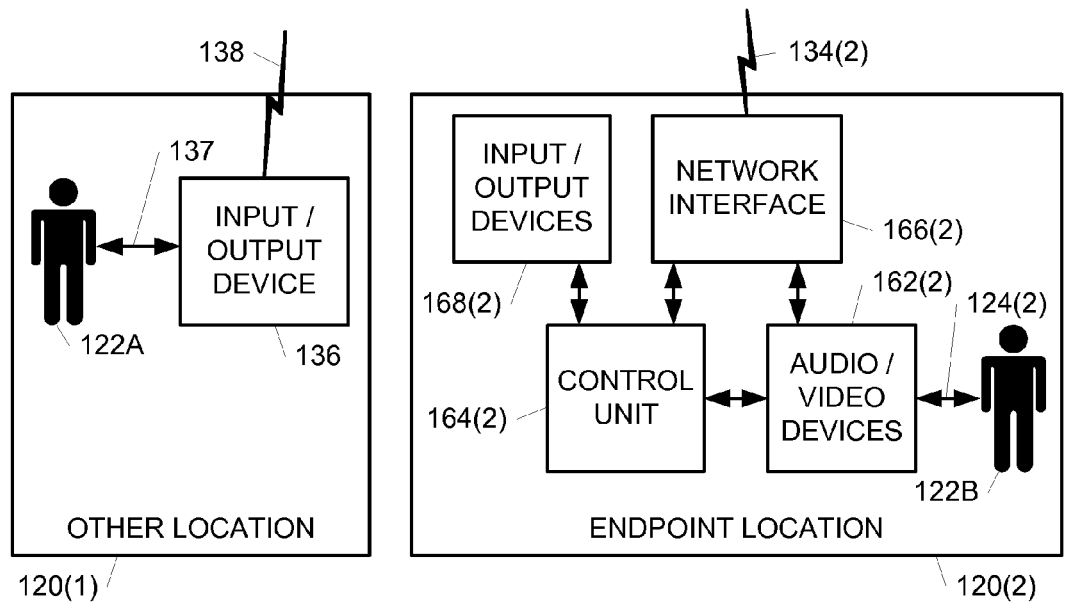

As another example shown in FIG. 5B, attendees 122A of event A may connect to event A using an I/O device 136 that is unrelated to the endpoint location of endpoint 120(2). Input/output device 136 forms event endpoint 120(1) for attendees 122A in the example of FIG. 5B. Attendees 122A, for example, may desire to move into endpoint 120(2) when event B that is using endpoint 120(2) concludes.

Attendees 122A use input/output device 136 from any suitable location that may be remotely located from or in close proximity to the endpoint location of endpoint 120(2). Input/output device 136 has no physical relationship with endpoint 120(2) in the example of FIG. 5B. Accordingly, event management system 110 does not initially recognize an association between input/output device 136 and endpoint 120(2) using event endpoint information and policies 144. Input/output device 136, however, may form a virtual association with event endpoint 120(2) through communications with event management system 110. Attendees 122A may use input/output device 136 in conjunction with event management system 110 to provide media streams 137 to attendees 122A and/or capture media streams 137 from attendees 122A. Audio/video devices 162(2) of endpoint 120(2) provide media streams 124(2) to attendees 122B and/or capture media streams 124(2) from attendees 122B.

Figure 5C:
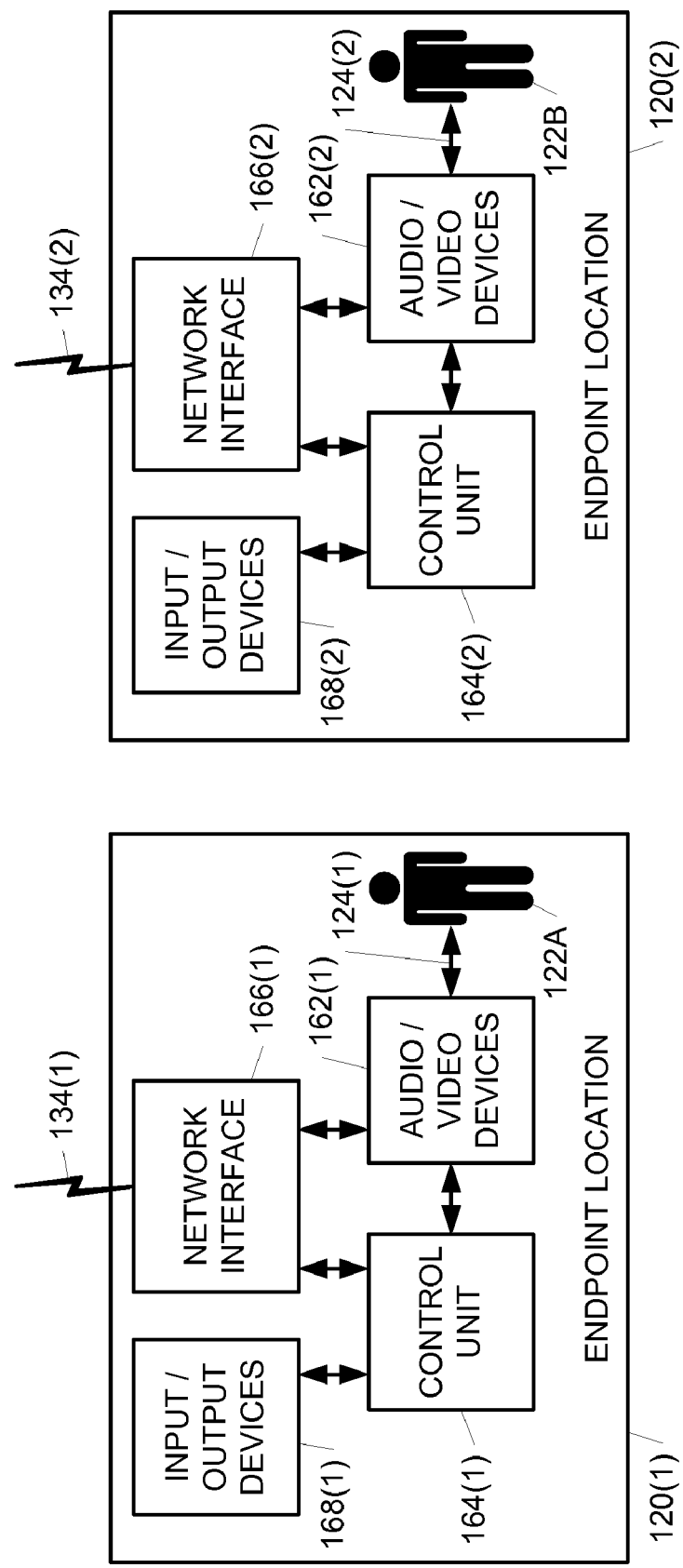

As a further example shown in FIG. 5C, attendees 122A of event A may begin their event at endpoint 120(1) where endpoint 120(1) includes audio/video devices 162(1) and is nearby another endpoint 120(2) with audio/video devices 162(2).

Attendees 122A, for example, may desire to move into endpoint 120(2), which includes resources that are more suited for event A than the resources of endpoint 120(1), when event B that is using endpoint 120(2) concludes. Attendees 122B of event B may eventually conclude their event to make event endpoint 120(2) available to event A or may indicate a desire or willingness to swap endpoint 120(2) with endpoint 120(1) as shown and described in the example of FIG. 6 below. Audio/video devices 162(1) provide media streams 124(1) to attendees 122A and/or capture media streams 124(1) from attendees 122A, and audio/video devices 162(2) provide media streams 124(2) to attendees 122B and/or capture media streams 124(2) from attendees 122B.

In each of the embodiments of FIGS. 5A-5C, when endpoint 120(2) becomes available to the first event, event management system 110 redirects media streams 124(1) from endpoint 120(1) to become media streams 124(2) at endpoint 120(2) and interacts with attendees 122A to cause attendees 122A to move to endpoint 120(2). If desired, event management system 110 may also redirect media streams 124(2) from endpoint 120(2) to become media streams 124(1) at endpoint 120(1) and interact with attendees 122B to cause attendees 122B to move to endpoint 120(1). Event management system 110 may perform the reconfiguration automatically (e.g., in response to detecting predetermined conditions such as the second event concluding) or in response to a request from attendees 122A and/or 122B.

Figure 6:
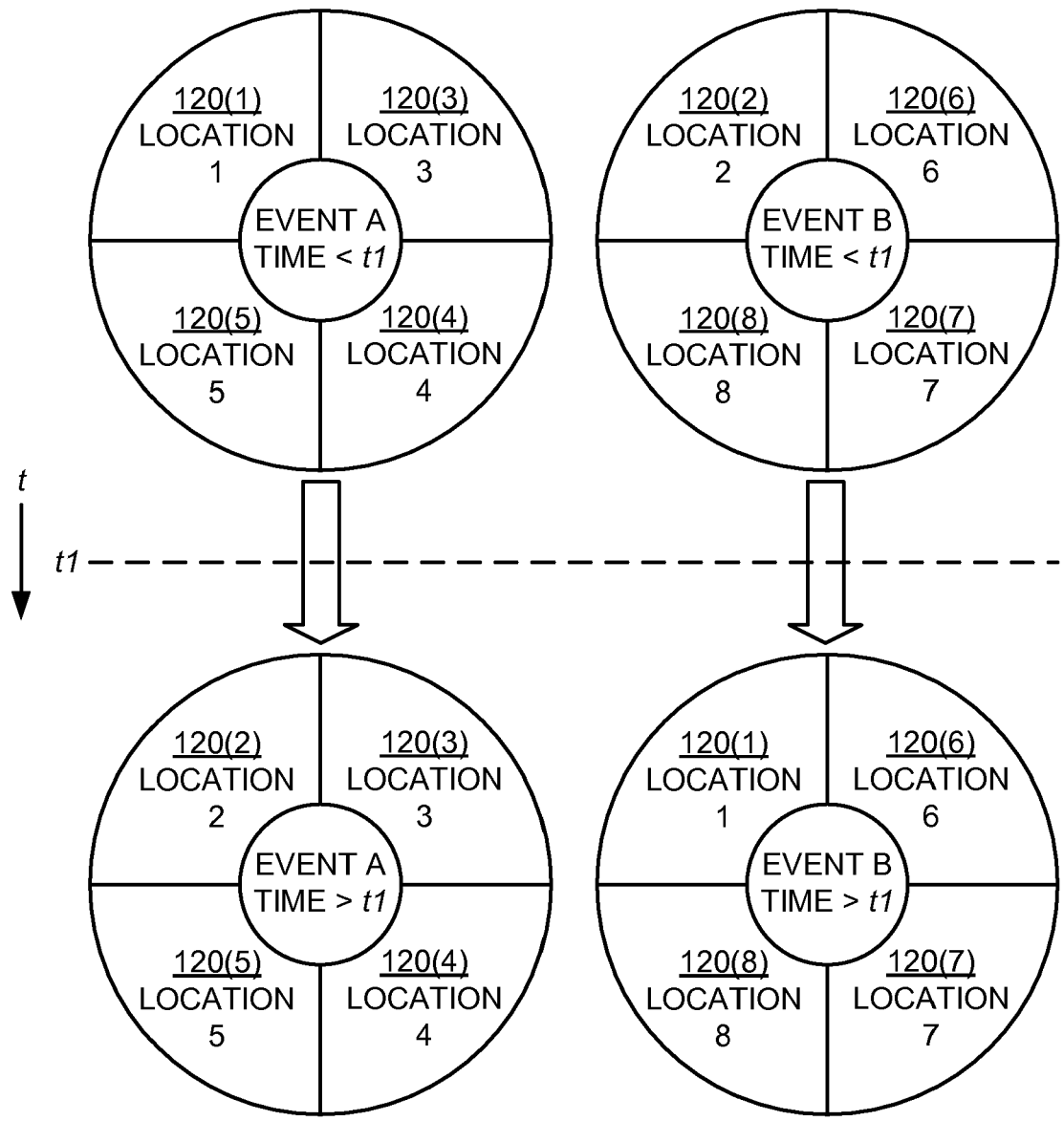
FIG. 6 is a block diagram illustrating one embodiment of events reconfigured by an event management system.
Figure 7:
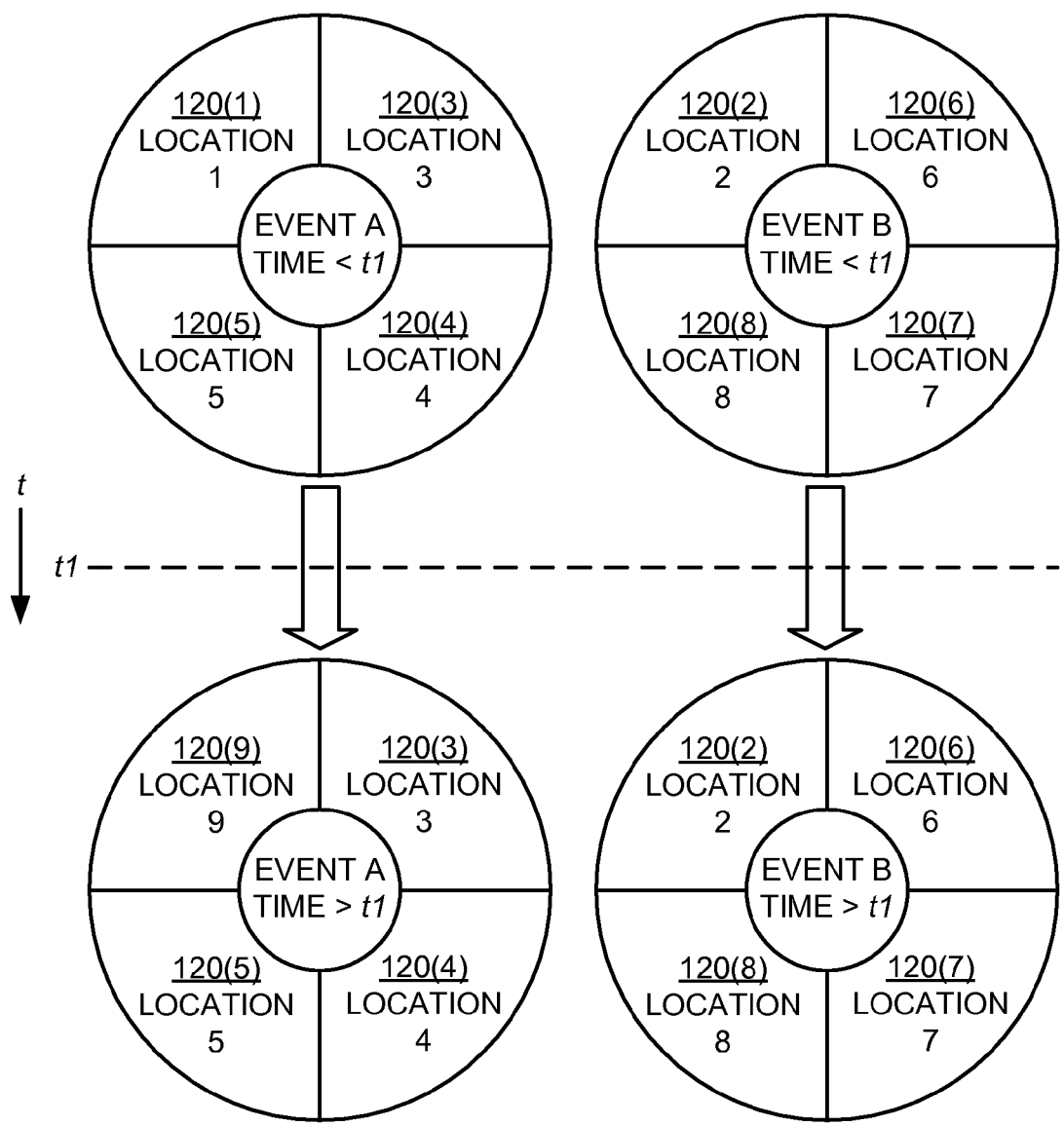
FIG. 7 is a block diagram illustrating one embodiment of an event reconfigured by an event management system.

FIGS. 6 and 7 illustrate examples of reconfiguring one or more events. In the example of FIG. 6, events A and B swap endpoints 120(1) and 120(2) during events A and B. In the example of FIG. 7, event A moves from one endpoint 120(1)

to an alternate endpoint 120(9) during the event when a desired endpoint 120(2) is in use by event B.

FIG. 6 is a block diagram illustrating one embodiment of events A and B being reconfigured by event management system 110. Prior to a time t1, event management system 110 initiates and begins hosting events A and B. Event A initially includes endpoints 120(1) and 120(3)-120(5) at respective locations 1 and 3-5 that provide respective media streams 124(1) and 124(3)-124(5) to respective sets of attendees 122(1) and 122(3)-122(5) (not shown in FIG. 6). Event B initially includes endpoints 120(2) and 120(6)-120(8) at respective locations 2 and 6-8 that provide respective media streams 124(2) and 124(6)-124(8) to respective sets of attendees 122(2) and 122(6)-122(8) (not shown in FIG. 6).

At or around time t1, event management system 110 reconfigures events A and B to swap endpoints 120(1) and 120(2). To do so, event management system 110 redirects media streams 124(1) from endpoint 120(1) to endpoint 120(2) and redirects media streams 124(2) from endpoint 120(2) to endpoint 120(1) contemporaneously with redirecting media streams 124(1). Event management system 110 provides information to attendees 122(1) to cause attendees 122(1) to move from location 1 to location 2 and provides information to attendees 122(2) to cause attendees 122(2) to move from location 2 to location 1. Event management system 110 updates the registered event specification 142 for event A to add endpoint 120(2) and remove endpoint 120(1). Event management system 110 also updates the registered event specification 142 for event B to add endpoint 120(1) and remove endpoint 120(2). Accordingly, after time t1, event A includes endpoints 120(2)-120(5) at respective locations 2-5, and event B initially includes endpoints 120(1) and 120(6)-120(8) at respective locations 1 and 6-8.

The example of FIG. 6 may represent a scenario where event A desires to use endpoint 120(2) before event B concludes. Rather than waiting for event B to conclude, event A begins with a less desirable or sub-optimal endpoint 120(1) and then eventually swaps endpoint 120(1) for endpoint 120(2) while event B is still in progress. Event management system 110 may initiate the swap in response to detecting predetermined conditions associated with event A and/or event B or in response to a request from attendees 122(1) and/or attendees 122(2).

FIG. 7 is a block diagram illustrating one embodiment of an event A being reconfigured by event management system 110. Event A is scheduled to include endpoints 120(2)-120(5). Endpoint 120(2), however, is in use by event B when event A commences, and the attendees 122 of event A opt to start event A with endpoint 120(1).

Prior to a time t1, event management system 110 initiates and begins hosting events A and B. Event A initially includes endpoints 120(1) and 120(3)-120(5) at respective locations 1 and 3-5 that provide respective media streams 124(1) and 124(3)-124(5) to respective sets of attendees 122(1) and 122(3)-122(5) (not shown in FIG. 7). Event B includes endpoints 120(2) and 120(6)-120(8) at respective locations 2 and 6-8 that provide respective media streams 124(2) and 124(6)-124(8) to respective sets of attendees 122(2) and 122(6)-122(8) (not shown in FIG. 7).

At or around time t1, event management system 110 reconfigures event A to move endpoint 120(1) to 120(9). To do so, event management system 110 redirects media streams 124(1) from endpoint 120(1) to endpoint 120(9) at location 9. Event management system 110 provides information to attendees 122(1) to cause attendees 122(1) to move from location 1 to location 9 updates the registered event specification 142 for event A to add endpoint 120(9) and remove endpoint 120(1). Accordingly, after time t1, event A includes endpoints 120(3)-120(5) and 120(9) at respective locations 3-5 and 9. Event B remains unchanged.

The example of FIG. 7 may represent a scenario where event A desires to use endpoint 120(2) before event B concludes. Rather than waiting for event B to conclude, event A begins with a less desirable or sub-optimal endpoint 120(1). When event A decides that it no longer wants to wait for endpoint 120(2) or endpoint 120(9) becomes available, endpoint 120(1) is moved to endpoint 120(9). Event management system 110 may initiate the move in response to detecting predetermined conditions associated with event A, event B, and/or endpoint 120(9) or in response to a request from attendees 122(1).

In the above embodiments, event management system 110 may include any suitable combination of hardware and software components. In one embodiment, event management system 110 includes one or more programs that is stored in any suitable type, number, and/or combination of portable or non-portable storage media (not shown) within or otherwise accessible to event management system 110. The programs are accessible to and executable by any suitable type, number, and/or combination of processors (not shown) in event management system 110 to perform the functions described above.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the optical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited by the claims and the equivalents thereof.

What is claimed is:

1. A method performed by an event management system including at least one processing element, the method comprising:

hosting a first collaboration event that includes first and second event endpoints that provide respective first and second sets of audio/visual (A/V) media streams to respective first and second sets of attendees during the first collaboration event;

hosting a second collaboration event that includes third and fourth event endpoints that provide respective third and fourth sets of A/V media streams to respective third and fourth sets of attendees during the second collaboration event;

while hosting the first collaboration event, reconfiguring the first collaboration event to cause the third event endpoint to provide a third fifth set of audio/visual A/V media streams to at least one of the first set of attendees at the third event endpoint; and while hosting the first collaboration event, reconfiguring the second collaboration event to cause the first event endpoint to provide a sixth set of A/V media streams to the third set of attendees at the first event endpoint substantially contemporaneously with reconfiguring the first collaboration event to cause the third event endpoint to provide the fifth set of A/V media streams to the first set of attendees at the third event endpoint.

2. The method of claim 1 further comprising:
adjusting a registered event specification of the first collaboration event to add the third event endpoint.

3. The method of claim 2 further comprising:
reconfiguring the first collaboration event to cause the first event endpoint to stop providing the first set of audio/visual (A/V) media streams at the first event endpoint.

4. The method of claim 3 further comprising:
adjusting the registered event specification of the first collaboration event to remove the first event endpoint.

5. The method of claim 1 further comprising:
providing information to the first set of attendees that directs the first set of attendees to the third event endpoint.

6. The method of claim 1 wherein the first event endpoint is in a first location that differs from a second location of the third event endpoint.

7. The method of claim 1 further comprising:
reconfiguring the first collaboration event in response to receiving a request from the first set of attendees.

8. The method of claim 1 further comprising:
reconfiguring the first collaboration event in response to status information corresponding to the first collaboration event and the second collaboration event.

9. The method of claim 1 further comprising:
reconfiguring the first collaboration event in response to receiving a request from the second collaboration event.

10. A program product comprising:
a program executable by a processor for causing the processor to:
host a first collaboration event that includes first and second event endpoints that provide respective first and second sets of audio/visual (A/V) media streams to respective first and second sets of attendees during the first event;
host a second collaboration event that includes third and fourth event endpoints that provide respective third and fourth sets of A/V media streams to respective third and fourth sets of attendees during the second collaboration event;
during the first collaboration event, redirect the first set of A/V media streams from the first event endpoint to the first set of attendees at the third event endpoint; and
during the first collaboration event, redirect the third set of A/V media streams from the third event endpoint to the third set of attendees at the first event endpoint substantially contemporaneously with redirecting the first set of A/V media streams from the first event endpoint to the first set of attendees at the third event endpoint; and
a non-transitory computer readable medium that stores the program so that the program is accessible by the processor.

11. The program product of claim 10 wherein the program is executable by the processor for causing the processor to:
adjust a first registered event specification of the first collaboration event to specify the third event endpoint; and
adjust a second registered event specification of the second collaboration event to specify the first event endpoint.

12. The program product of claim 10 wherein the program is executable by the processor for causing the processor to:
provide first information to the first set of attendees to direct the first set of attendees to the third event endpoint; and
provide second information to the second set of attendees to direct the second set of attendees to the first event endpoint.

13. The program product of claim 10 wherein the first event endpoint is outside of a room that includes the third event endpoint.

14. The program product of claim 10 wherein the program is executable by the processor for causing the processor to:
redirect the first set of A/V media streams in response to detecting an overlap between the first collaboration event and the second collaboration event.

15. A system comprising:
one or more computing processors;
a network interface configured to connect to a network; and
an event management system coupled to the network interface, including:
a first registered event specification of a first collaboration event that is configured to include at least first and second event endpoints that provide respective first and second sets of audio/visual (A/V) media streams to respective first and second sets of attendees; and
a second registered event specification of a second collaboration event that is configured to include at least third and fourth event endpoints that provide respective third and fourth sets of A/V media streams to respective third and fourth sets of attendees;
wherein the event management system is configured to:
during the first collaboration event, reconfigure the first collaboration event to cause the third event endpoint to provide the first set of A/V media streams to the first set of attendees at the third event endpoint using the network interface; and
during the first collaboration event, reconfigure the second collaboration event to cause the first event endpoint to provide the third set of A/V media streams to the third set of attendees at the first event endpoint using the network interface.

16. The system of claim 15 wherein the event management system is configured to add the third event endpoint to the first registered event specification.

17. The system of claim 16 wherein the event management system is configured to remove the first event endpoint from the first registered event specification.

18. The system of claim 17 wherein the event management system includes event information that indicates that the third event endpoint is near the first event endpoint.

19. A method performed by an event management system including at least one processing element, the method comprising:
hosting a first collaboration event that provides first and second sets of audio/visual (A/V) media streams to respective first and second set of attendees during the first collaboration event;
hosting a second collaboration event that provides third and fourth sets of A/V media streams to respective third and fourth set of attendees during the second collaboration event; and
while hosting the first collaboration event:
directing transmission of the first, second, third, and fourth sets of A/V media streams to the respective first, second, third, and fourth set of attendees at respective first, second, third, and fourth event endpoints;
redirecting the transmission of the first set of A/V media streams from the first event endpoint to the first set of attendees at the third event endpoint; and terminating the transmission of the third set of A/V media streams to the third event endpoint.

20. A method performed by an event management system including at least one processing element, the method comprising:

hosting a first collaboration event that provides first and second sets of audio/visual (A/V) media streams to respective first and second set of attendees during the first collaboration event;

hosting a second collaboration event that provides third and fourth sets of A/V media streams to respective third and fourth set of attendees during the second collaboration event; and while hosting the first collaboration event:
directing transmission of the first, second, third, and fourth sets of A/V media streams to the respective first, second, third, and fourth set of attendees at respective first, second, third, and fourth event endpoints;

redirecting the transmission of the first set of A/V media streams from the first event endpoint to the first set of attendees at the third event endpoint; and redirecting the transmission of the third set of A/V media streams to a fifth event endpoint.

* * * * *

UNITED STATES PATENT AND TRADEMARK OFFICE
CERTIFICATE OF CORRECTION

| | |
|---|---|
| PATENT NO. | : 7,792,901 B2 |
| APPLICATION NO. | : 12/251686 |
| DATED | : September 7, 2010 |
| INVENTOR(S) | : Ted Beers et al. |

It is certified that error appears in the above-identified patent and that said Letters Patent is hereby corrected as shown below:

In column 12, line 57, in Claim 1, before "fifth" delete "third".

In column 12, line 57, in Claim 1, after "set of" delete "audio/visual".

In column 14, line 45, in Claim 18, delete "claim 17" and insert -- claim 15 --, therefor.

Signed and Sealed this
Eighth Day of March, 2011

David J. Kappos
*Director of the United States Patent and Trademark Office*